United States Patent Office 3,511,112
Patented May 12, 1970

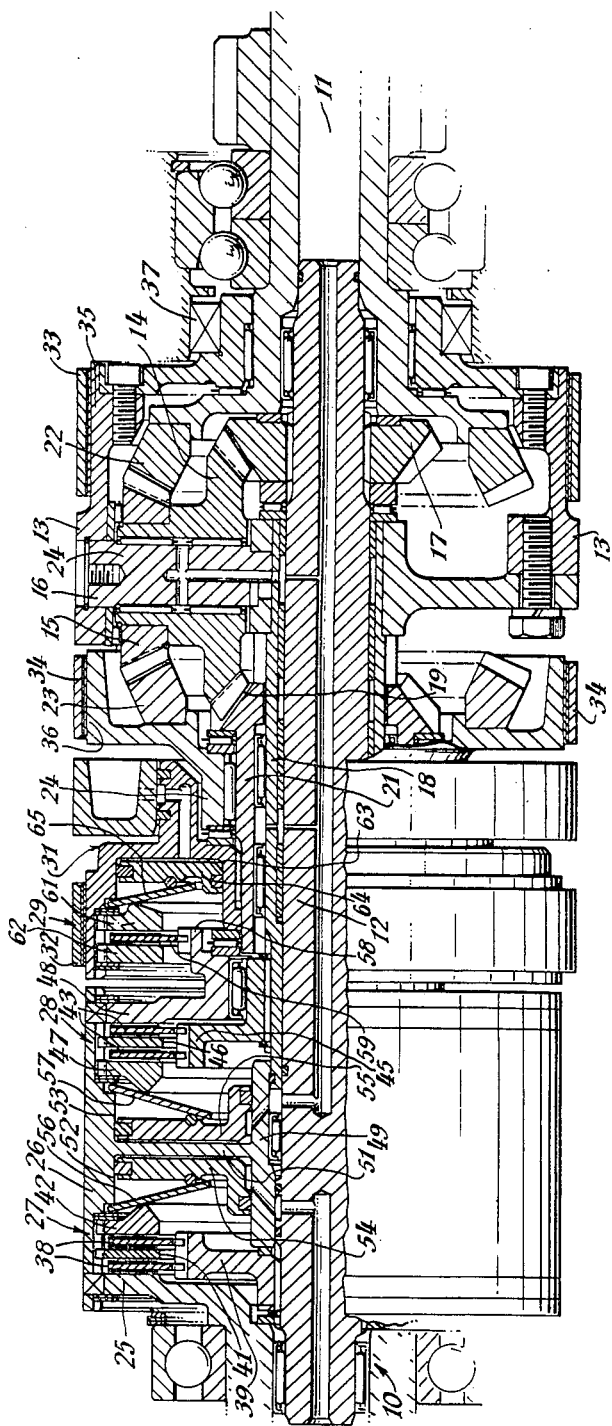

3,511,112
POWER TRANSMISSION MECHANISM PROVIDING CHANGES OF GEAR RATIO
John F. Power and Frederick E. Ellis, Warwickshire, England, assignors to Automotive Products Company Limited, Warwickshire, England
Filed Apr. 11, 1968, Ser. No. 720,621
Int. Cl. F16h *57/10*
U.S. Cl. 74—757                                          8 Claims

ABSTRACT OF THE DISCLOSURE

In a power transmission mechanism comprising bevel pinion clusters mounted on a carrier with their axes in planes radial to the axis of the carrier, two driving bevel gears and one driven bevel gear meshing with the bevel pinions, and means for holding the carrier and one of the driving bevel gears against rotation to serve as reaction members for the gear train, means are provided for coupling the input shaft directly to the cluster carrier whilst the driving bevel gear is held, to provide an overdrive ratio.

---

This invention relates to power transmission mechanism providing changes of gear ratio, primarily for use in motor vehicles for transmitting power from an internal combustion engine to road wheels, the mechanism embodying a gear train of the kind comprising bevel pinion clusters mounted on a carrier, the axes of the clusters lying in planes radiating from an axis about which the carrier is rotatable, and each of the said clusters comprising two bevel pinions rotatable together as one, and the said bevel pinions meshing with other bevel gears rotatable about the same axis as the carrier.

By arranging for either one of two of the said other bevel gears to be driven by the engine, coupling an output shaft to another of said other bevel gears, and providing means for selectively holding different bevel gears or the carrier against rotation, a plurality of gear reduction ratios can be obtained, whereas by causing the whole gear train to rotate as one, a one-to-one ratio between the input and output can be obtained.

It is the object of the present invention to provide a power transmission mechanism embodying a gear train of the kind referred to in which the number of gear ratios obtainable is increased by providing one or more overdrive ratios.

According to the present invention in a power transmission mechanism embodying a gear train of the kind referred to, the bevel gears rotatable about the same axis as the carrier including two driving bevel gears, and a driven bevel gear coupled to an output shaft, and clutch means being provided for selectively coupling one or other of the driving bevel gears to an input shaft by which power from a prime mover is fed into said transmission mechanism, is characterised in that additional clutch means are provided to couple the carrier on which the bevel pinion clusters are mounted to the said input shaft so as to cause the said carrier to rotate at the same speed as said input shaft.

By engaging the said additional clutch means and at the same time holding against rotation selected ones of the said other bevel gears the carrier is caused to rotate, the bevel pinion clusters rolling around the bevel gear which is held against rotation and thus rotating the driven bevel gear at a higher speed than the input shaft.

Preferably, the said carrier is mounted on and rotatable with a sleeve, the said additional clutch means acting to transmit the drive from the input shaft to said sleeve.

One example of a power transmission mechanism according to the invention will now be described with reference to the accompanying drawing, the single figure of which is a longitudinal sectional elevation of the said mechanism.

Referring to the drawing, the said power transmission mechanism comprises co-axial input and output shafts 10 and 11 spaced apart in the direction of their axis, a third shaft 12 which extends between them being journalled in bearings in co-axial recesses in the ends of the said input and output shafts.

A carrier member 13 rotatable on the third shaft 12 carries two or more bevel pinion clusters each comprising a larger inner bevel pinion 14 and a smaller outer bevel pinion 15 rotatable together as one about a pivot shaft 16 lying in a plane radial to the axis of the third shaft, the said pivot shaft 16 being normal to the said axis. A first driving bevel gear 17 fixed on the third shaft 12 meshes with the larger, inner bevel pinions 14 of the clusters on the side of the cluster axes nearer to the output shaft 11. The bevel pinion cluster carrier member 13 is fixedly mounted on a first sleeve 18 rotatable on the third shaft 12 and extending towards the input shaft 10, and a second driving bevel gear 19, meshing with the larger, inner bevel pinions 14 on the side of the cluster axes nearer to the input shaft 10 is mounted on a second sleeve 21 rotatable on the first sleeve 18.

An output bevel gear 22 fixed on the output shaft 11 meshes with the smaller, outer bevel pinions 15 of the clusters on the side of the cluster axes nearer to the output shaft 11, and a fourth bevel gear 23 mounted on a carrier ring 24 rotatable on the second sleeve 21, meshes with the said outer, smaller bevel pinions 15 on the side of the cluster axes nearer to the input shaft 10.

The input shaft 10 is formed with a flange 25 to which is coupled for rotation therewith a cylindrical casing 26 extending towards the output shaft 11 and over-lapping the adjacent end of the first sleeve 18, the said cylindrical casing 26 being spaced radially from the third shaft 12 and first sleeve 18. In the space enclosed by the cylindrical casing there are mounted two friction clutches 27 and 28, of the plate type, the clutch 27, when engaged, coupling the third shaft 12 to the said casing, whilst the other clutch 28, when engaged, couples the first sleeve 18 to the said casing 26. Another friction clutch 29, also conveniently of the plate type, acts, when engaged, to couple the second sleeve 21 to the casing 26, the driven member 31 of the said clutch 29 including a drum co-operating with a band brake 32 by means of which the said driven member 31, and with it the second sleeve 21 and second driving bevel gear 19, may be held against rotation. Second and third band brakes 33 and 34 co-operate with drums 35 and 36 on the carrier member 13 for the bevel pinion clusters and on the carrier ring 24 for the fourth bevel gear respectively.

A one-way clutch 37 is provided, which acts to hold the carrier member 13 against rotation in the direction opposite to the rotation of the input shaft 10.

The clutch 27 comprises two driven plates 38 keyed to a hub 39 which is in turn keyed to the third shaft 12, an intermediate driving plate 41 keyed to the cylindrical casing 26, and a pressure plate 42 acting to press the said plates against a driving surface on the flange 25, to which flange the casing 26 is fixed against axial movement. The clutch 28 similarly comprises two driven plates 43 keyed to a hub 45 which is in turn keyed to the first sleeve 18, an intermediate driving plate 46 keyed to the casing 26, and a pressure plate 47 acting to press the said plates against a driving surface on an annular disc 48 rotating with and axially fixed in relation to the casing 26. An inner cylindrical wall 49, connected to the casing 26 by an annular web 51 defines, with the said casing 26 two annular cylinders 52 and 53 in which are slidable annular pistons 54 and 55 respectively. Fluid under pressure admitted to the annular cylinders 52 and 53 respectively displaces the pistons 54 and 55 therein, the pistons acting through lever members 56 and 57 to engage the two clutches.

The annular disc 48 has integral with it a coaxial cylindrical projection 58 on which is keyed a driving plate 59 for the clutch 29, a pressure plate 61, keyed to the driven member 31 of that clutch, acting to press the driving plate 59 against a further plate 62 fixed against both axial and rotational movement relative to the driven member 31. The driven member 31 defines an annular cylinder 63 in which is slidable an annular piston 64 acting on the pressure plate 61 through radial levers 65.

The brake bands 32, 33 and 34 are arranged to be contracted on to their associated drums by fluid pressure acting in suitable motor cylinders (not shown) and the brakes and clutches are engageable singly or in various combinations to provide the different transmission ratios by control valve means controlling the connections of the motor cylinders of the said brakes and clutches to a source of fluid under pressure.

The control valve means may be operated manually, or may be operated automatically in response to the speed of an internal combustion engine or other prime mover with which the transmission mechanism is associated.

The transmission mechanism specifically described and illustrated provides three speed reduction ratios, a direct drive, two overdrive ratios and one reverse gear ratio.

The fourth bevel gear 23 and its associated brake mechanism may be omitted if desired thus cutting out one speed reduction ratio and one overdrive ratio.

The various speed ratios are brought into operation in the following manner.

The ratio giving the greatest speed reduction is provided by engaging the clutch 27 between the cylindrical casing 26 and the third shaft 12, so that the first input bevel gear 17 rotates the bevel pinion clusters 14, 15 and the output bevel gear 22, producing a reaction tending to rotate the bevel pinion cluster carrier 13 backwardly. This reaction is absorbed by the one-way clutch 37.

The ratio giving the next lower speed reduction is provided by engaging the clutch 27 between the cylindrical casing 26 and the third shaft 12 and also engaging the brake 34 on the fourth bevel gear 23. The bevel pinion clusters 14, 15 are again rotated by the first input bevel gear 17, causing the outer, smaller bevel pinions 15 to roll around the fourth bevel gear 23 and so rotate the output bevel gear 22 at a higher speed than if the bevel gear cluster carrier 12 was stationary.

The ratio giving the smallest speed reduction is obtained by engaging the clutch 27 between the cylindrical casing 26 and the third shaft 12, and also engaging the brake 32 on the driven member 31 of the clutch 29 associated with the second input bevel gear 19, so that the bevel pinion clusters 14, 15 are driven in the manner just described but roll around the said second input bevel gear 19.

Direct drive is obtained by engaging the clutches 27 and 28 between the cylindrical casing 26 and both the third shaft 12 and the first sleeve 18, so that the whole gear train rotates bodily.

A first overdrive ratio is provided by engaging the clutch 28 between the cylindrical casing 26 and the first sleeve 18 and applying the brake 32 to the driven member 31 of the third clutch so as to hold the second driving bevel gear 19 against rotation. The bevel pinion cluster carrier 13 then rotates with the input shaft 10, causing the inner, larger bevel pinions 14 to roll around the second driving bevel gear 19 and the outer, smaller bevel pinions 15 driving the output bevel gear at a higher speed than the input shaft 10.

A second overdrive ratio is provided by engaging the clutch 28 between the cylindrical casing 26 and the first sleeve 18 and applying the brake 34 to the drum 36 associated with the fourth bevel gear 23, providing the same effect as with the first overdrive ratio except that the bevel pinion clusters 14, 15 roll around the fourth bevel gear 23 instead of around the second driving bevel gear 19, and provide a greater step-up ratio.

Reverse drive is obtained by engaging the clutch 29 between the cylindrical casing 26 and the second sleeve 21, so that the second input bevel gear 19 drives the bevel pinion clusters 14, 15, and applying the brake 33 to the bevel pinion cluster carrier 13 to hold it against rotation. The output bevel gear 22, and the output shaft 11 are thus rotated in the opposite direction to the input shaft 10.

Assuming that the axes of the bevel pinion clusters 14, 15 are normal to the axis of the third shaft 18, the lowest forward ratio and the reverse gear ratio will be equal and will depend on the proportions of the bevel gears and bevel pinions. The remaining gear reduction ratios and the first overdrive ratio all bear a fixed relation to the lowest forward ratio, whereas the second overdrive ratio is in all cases 0.5:1. If the lowest forward ratio is R, the next ratio is $$\frac{R+1}{2}$$

and the next is $$\frac{2R}{R+1}$$

The direct drive ratio is, of course 1:1 and the first overdrive ratio is $$\frac{R}{R+1}$$

By displacing the axes of the bevel pinion clusters 14, 15 from the position normal to the axis of the carrier member 13, so that the said axes are inclined outwardly towards the end of the transmission mechanism to which the input is connected, the reverse gear ratio can be made lower than the lowest forward gear ratio, and the relative values of all the ratios can be changed.

We claim:
1. A power transmission mechanism embodying a gear train comprising an input shaft means, an output shaft, carrier means including sleeve means between said input shaft means and said output shaft, bevel gear means rotatable about the axis of said carrier coupling said input shaft means to said output shaft, bevel pinion clusters mounted on said carrier, each of said clusters comprising two bevel pinions rotatable together as one in a plane substantially normal to the axis of said carrier, said bevel gears comprising two driving bevel gears and one driven bevel gear meshing with said bevel pinions, a plurality of clutch means and brake means for selectively holding different of said bevel gears and said carrier against rotation as reactive members for said gear train including means for four forward speeds for the output shaft in the same direction of the input shaft means including means for a plurality of overdrive ratios therefor and at least one reverse drive speed for the output shaft in the opposite direction of rotation of the input shaft means.

2. A power transmission mechanism according to claim 1, wherein the said carrier is mounted on and rotatable with said sleeve, additional clutch means acting to transmit the drive from the input shaft to said sleeve means.

3. A power transmission mechanism according to claim 2, comprising said input shaft means, and output shaft coaxial with and spaced apart from the input shaft means, a third shaft between and co-axial with said input shaft means and output shafts, a first sleeve rotatably mounted on said third shaft, a carrier member mounted on said first sleeve so as to rotate therewith, bevel pinion clusters mounted on said carrier member to rotate about axis in planes radiating from the axis about which said carrier member rotates, each of said bevel pinion clusters comprising a larger inner bevel pinion and a smaller outer bevel pinion rotatable together as one, a first driving bevel gear mounted on said third shaft and meshing with the inner bevel pinions of the clusters on the side of the latter adjacent the output shaft, a second sleeve rotatable on said first sleeve, a second driving bevel gear mounted on said second sleeve and meshing with the inner bevel pinions of the clusters on the side of the latter adjacent the input shaft, a driven bevel gear mounted on the output shaft and meshing with the outer bevel pinions of the clusters on the side of the latter adjacent the output shaft, first clutch means to couple said input shaft to the third shaft, second clutch means to couple the input shaft to the second sleeve, third clutch means to couple the input shaft to the first sleeve, and first and second brake means to prevent rotation of said carrier member and said second driving bevel gear.

4. A power transmission mechanism according to claim 3, comprising a fourth bevel gear, mounted for rotation about said second sleeve, meshing with the outer bevel pinions of the clusters on the side of the latter adjacent the input shaft, and a second brake means including means to hold said fourth bevel gear against rotation.

5. A power transmission mechanism according to claim 4, comprising a cylindrical member co-axial with the driving and driven shafts in permanent driving engagement with said input shaft means, and first and third clutch means being mounted in said cylindrical member.

6. A power transmission mechanism according to claim 2, wherein the clutch means comprise plate clutches engaged by fluid pressure means.

7. A power transmission mechanism according to claim 5, wherein the axes of the bevel pinion clusters are normal to the axis about which the carrier member is rotatable.

8. A power transmission mechanism according to claim 6, wherein the axes of the bevel pinion clusters are inclined outwardly towards the input end of the mechanism.

References Cited

UNITED STATES PATENTS

| | | | |
|---|---|---|---|
| 873,681 | 12/1907 | Pendleton | 74—757 |
| 3,183,742 | 5/1965 | Ellis et al. | 74—757 |
| 3,238,816 | 3/1966 | Schottler | 74—690 |

ARTHUR T. McKEON, Primary Examiner

U.S. Cl. X.R.

74—777